No. 705,385. Patented July 22, 1902.
G. S. COOVER.
END GATE FOR WAGONS.
(Application filed Mar. 20, 1902.)

(No Model.)

Inventor
Gideon S Coover,

Witnesses
By Victor J. Evans
Attorney

THE NORRIS PETERS CO., PHOTO-LITHO., WASHINGTON, D. C.

UNITED STATES PATENT OFFICE.

GIDEON S. COOVER, OF BOURNEVILLE, OHIO.

END-GATE FOR WAGONS.

SPECIFICATION forming part of Letters Patent No. 705,385, dated July 22, 1902.

Application filed March 20, 1902. Serial No. 99,187. (No model.)

*To all whom it may concern:*

Be it known that I, GIDEON S. COOVER, a citizen of the United States, residing at and whose post-office address is Bourneville, in the county of Ross and State of Ohio, have invented new and useful Improvements in Gates, of which the following is a specification.

This invention relates to new and useful improvements in end-gates for wagons; and its primary object is to provide a gate of simple construction which may be readily lowered and which can be moved out toward the extreme end of the wagon, thereby preventing the spilling of the material in the wagon while the gate is being lowered.

With these and other objects in view the invention consists in the novel construction, combination, and arrangement of parts, which will be hereinafter fully described, claimed, and illustrated in the accompanying drawings, showing the preferred form of my invention, and in which—

Figure 1:
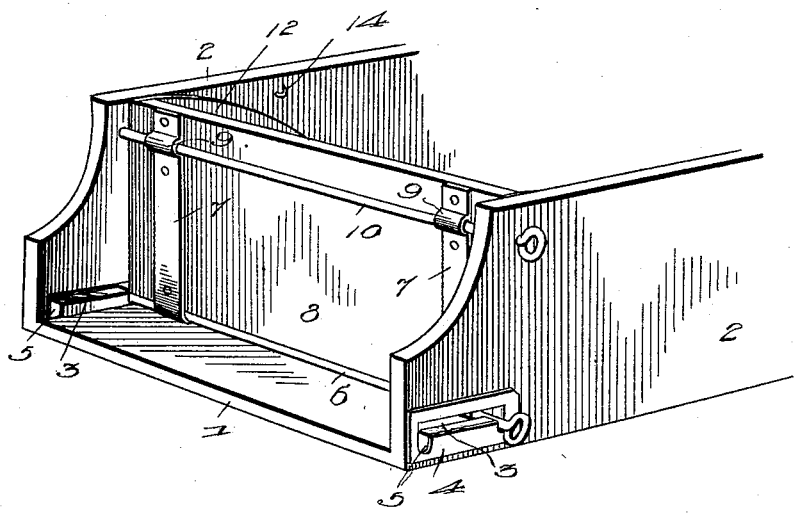
Figure 2:
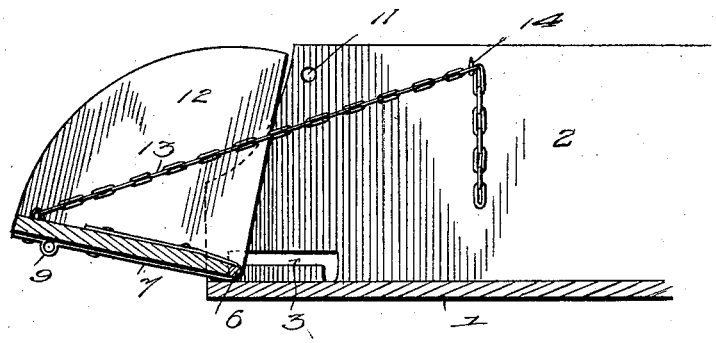

Figure 1 is a perspective view of the gate in position, and Fig. 2 is a section showing the end-gate lowered.

Referring to the drawings by numerals of reference, 1 is the bed or bottom of the wagon, the sides 2 of which are provided adjacent to their lower edges with slots 3. These slots are strengthened by metal plates 4, and at each end of the slots is a recess or depression 5. A rod 6 extends across the wagon and rests normally in the inner recesses 5 of the slots 3, as shown in Fig. 1. This rod is engaged by straps 7, which inclose the same and are secured at opposite sides of the end-gate 8. Lugs 9 are formed by the straps 7 near the upper edge of the end-gate, and these lugs receive a rod 10, which extends across the wagon and rests in apertures 11, formed in the sides.

Wings 12 are formed at the sides of the end-gate, and a chain 13 is secured to the outer edge of the gate, near each side thereof. These chains are adapted to engage hooks 14 on the wagon sides and support the gate in lowered position.

When it is desired to unload the wagon, the rod 10 is removed from the sides 2 and the gate is lifted, so as to raise rod 6 from the inner recesses 5. The gate is then slid back until said rod 6 drops into the outer recesses 5, and the gate is then swung downward, and the outer edge thereof is supported by the chains 13.

By moving the end-gate outward prior to lowering it the material in the wagon and adjacent to the gate is permitted to settle and is thereby prevented from spilling.

In the foregoing description I have shown the preferred form of my invention; but I do not limit myself thereto, as I am aware that modifications may be made therein without departing from the spirit or sacrificing any of the advantages thereof, and I therefore reserve the right to make all such changes and alterations which fairly fall within the scope of my invention.

Having thus described my invention, what I claim as new, and desire to secure by Letters Patent, is—

1. The combination of a wagon-body having horizontal slots in its sides terminating in front and rear recesses, an end-gate, a removable rod engaging the body, sides, and the gate, a rod adjustably mounted in the said slots and serving as a pivot for the end-gate, said latter rod normally resting in a recess of each slot, and wings for the end-gate.

2. The combination of a wagon-body having horizontal slots in its sides provided with enlarged terminal recesses, an end-gate, and a rod adjustably mounted in the slots of the body and serving as a pivot for the gate, said rod normally resting in a recess in each slot.

3. The combination of a wagon-body having horizontal slots in the rear terminals of the sides thereof provided with end recesses, an end-gate having straps secured thereon, a rod engaging the said straps and serving as a pivot for the gate, said rod normally engaging a recess in each slot in the sides, a securing-rod also removably engaging the straps and the sides, and a supporting-chain secured to the gate and adapted to be adjustably held by the body.

In testimony whereof I affix my signature in presence of two witnesses.

GIDEON S. COOVER.

Witnesses:
JOHN E. McKENNEY,
AMBROSE B. VOSE.